Patented Aug. 28, 1934

1,971,969

UNITED STATES PATENT OFFICE 1,971,969

GRANULAR MATERIAL FOR GAS PURIFICATION AND METHOD OF MAKING THE SAME

Gilbert E. Seil, Conshohocken, Pa., assignor to E. J. Lavino and Company, Philadelphia, Pa., a corporation of Delaware No Drawing. Application April 13, 1933, Serial No. 666,065

10 Claims. (Cl. 252—2.5)

My invention relates to a material for use in the purification of gases, especially gases from which hydrogen sulphide is to be removed, and to the method of making said material; and more particularly it relates to a product in granular form of high porosity consisting of cryptocrystalline ferric oxide, artificially prepared, as the active and principal ingredient.

One of the objects of my invention is to provide porous granules or artificially prepared cryptocrystalline ferric oxide which may be successfully used in the purification of gases to remove impurities therefrom, particularly hydrogen sulphide, and which after saturation by the impurities may be easily and economically revivified.

A further object of my invention is to provide a gas-purification material in the form of porous granules which may be employed directly without being formed into a sponge with materials such as wood shavings and the like as has previously been necessary, and which in use will present little, if any, back pressure, so that beds of relatively great thickness may be employed without rendering the gas purification process difficult or uneconomical.

Still another object of my invention is to provide a simple and economical process for the manufacture of porous granules of artificially prepared cryptocrystalline ferric oxide, which process is expedient to carry out and may be employed with a minimum of equipment.

Other objects will be apparent from a consideration of the specification and claims.

In the purification of gases, particularly industrial gases such as illuminating gas, it is necessary that the gases be treated in a purification process to remove hydrogen sulphide therefrom. Certain materials consisting of ferric oxide in very finely divided form have been used in large quantities, since it has been found that they react with the hydrogen sulphide gas to form ferric sulphide and water, with the result that the gas passing through the ferric oxide is substantially freed from the objectionable hydrogen sulphide. A secondary reaction also takes place between the hydrogen sulphide and oxygen with the formation of sulphur and water, if certain conditions are maintained; for example, if the oxygen content of the gas is more than .4%, the active iron oxide is at least 15% fouled. In the treatment of gases, the material employed for purifying must be kept moist to obtain economical results, since the moisture acts as a solvent for the hydrogen sulphide and holds it in contact with the ferric oxide for a sufficient time to allow the reaction to take place.

In other words, the water acts as a differential solvent for the hydrogen sulphide and is, therefore, a concentrating agent. The moisture may be applied to the ferric oxide mass by the admission of steam with the entering gases, or by water spraying.

The removal of the hydrogen sulphide by the ferric oxide depends upon the activity of the particles of ferric oxide material employed, and it has been found that such materials vary widely as to their activity, one of the factors determining the activity being the method by which the ferric oxide is prepared. Furthermore, since the reaction between ferric oxide and hydrogen sulphide is a surface reaction, the amount of surface exposed determines in a very large measure the activity, and, therefore, the effectiveness of a mass of ferric oxide. Previously ferric oxide has been furnished to the trade in a very finely divided and comminuted condition in order to present as much a surface as possible for reaction. Most of the materials previously employed in the purification of gases are in the form of an impalpable powder of extreme fineness, for example, so fine that 90% of the particles passes through a 325 mesh screen.

Due to the finely divided condition of the ferric oxide, the powder cannot be used by itself in gas purification, since it offers too great a resistance to the passage of gas therethrough, which resistance is increased when the mass is moist. Powdered ferric oxide is necessarily, therefore, distributed through and upon an inert material, such as wood shavings, the resulting product being known as a "sponge". Particular care must be taken in the choice of the shavings and they should be large and thin in order to expose a large surface to be impregnated with the oxide, but at the same time of sufficient thickness to withstand the required load and handling. It is essential that too large a quantity of oxide is not used with respect to the amount of shavings employed because the gas can only penetrate a definite thickness of oxide, and any oxide beyond this thickness is inert. In the manufacture of the sponge, the oxide is mixed with water to form a paste which is then added to the shavings with constant mechanical stirring, and preferably by spraying. This method of making the sponge is generally employed, since it yields the most finely coated shavings, and the mass is free from lumps. Care must not only be employed in manufacturing the sponge, but must also be used in placing the sponge in the racks or trays of the gas purifying system. Since gas passing through a layer of oxide naturally takes the path of least resistance, it is essential that the box be uniformly packed to eliminate channeling as far as possible. The manufacture of the sponge and the placing of it in the racks or trays are laborious processes and great care must be taken to prevent uneven distribution of the materials. The sponge after continued use becomes fouled, and is discarded. This represents a loss not only in material, but also in labor. The processes described and claimed in my prior patents Nos. 1,809,990, issued June 16, 1931, and 1,818,871, issued August 11, 1931, result in a ferric oxide product in the form of an impalpable powder, and while a compound of high activity is produced, it cannot be employed directly, due to its fineness, but must be made into a sponge prior to use in the manner hereinbefore described. The process of the present invention results in a product which is a marked improvement over those produced by the prior patents.

The gas purifying material of the present invention is a departure from the previous materials which have been employed in very finely divided form, and is characterized by its granular nature, its porosity and its high activity. In the product of the invention, the individual grains, or granules, may be distinguished one from the other by manual manipulation and by visual examination with the naked eye. The ferric oxide mass, therefore, is made up of particles which roll upon each other when agitated, and whose size is such that the voids between the individual grains are not completely filled. The ferric oxide is cryptocrystalline in nature, as distinguished from colloidal material such as ferric oxide gel and the like.

Due to the fact that the individual particles of ferric oxide are of an appreciable size visible to the naked eye and are of high porosity, the material of the present invention may be employed in gas purification systems directly without admixture with wood shavings and the like with the assurance that the back pressure presented will be negligible from the standpoint of operation. The particles contain in the neighborhood of 40% to 60% of voids due to the process by which they are manufactured as will hereinafter appear, and, therefore, the particles may be termed spongy. The high porosity insures sufficient surface exposure to render the material very effective, in fact more effective than a comparable weight of ferric oxide in the form of an impalpable powder as previously employed. Since the use of wood shavings is avoided, not only is the cost of the shavings saved but also the labor involved in preparing the mixture of shavings and ferric oxide which, as before pointed out, requires considerable care and skill. The cost of placing the gas purification material in the system is also materially reduced in the present invention. For example, in a particular instance where two days were previously required to place the sponge in the racks or trays, the material of the present invention may be placed therein in only eight hours. The product of the present invention may also be regenerated or revivified without difficulty merely by passing air through the system which when brought in contact with the moist material causes the oxidation of the sulphur and the regeneration of the ferric oxide. The material after it has been fouled to such an extent that it must be replaced is much simpler to remove from the system than is the case where sponge is employed. Furthermore, after the removal of the fouled sponge, it is useless and presents a problem of waste disposal whereas the fouled material of the present invention can be sold for its sulphur content.

The product of the present invention is prepared by intimately mixing and sintering an iron-bearing substance and an alkaline material capable of reacting therewith under the sintering operation to form a material which after the reaction will, in the presence of water, be decomposed into a soluble and an insoluble compound (ferric oxide). Leaching will, therefore, remove the soluble compound from the ferric oxide which not only will remain substantially in its original shape and size but will also be of a very high porosity due to the multitude of minute voids which result from the removal of the soluble compounds therefrom. The percentage of voids will depend upon the ratio of soluble compounds to insoluble compounds resulting from the reaction with water which in turn depends upon the ratio of the initial ingredients employed. In general, the percentage of voids will be between 40% and 60%, and usually a product containing voids in the neighborhood of 50% will be obtained.

The iron-bearing material may be practically of any form or composition. Metallic iron in any divided form, for example, iron filings or borings, may be employed. Preferably, however, combined iron is utilized; for example, iron ore, pyrites cinder, or aniline sludge which is a by-product of the aniline industry containing iron present in the form of ferrous oxide together with various impurities. The use of iron-bearing compounds which are low in sulphur and silica are advantageously employed since the sulphur tends to form sulphates while the silica reacts with the alkali to form compounds such as sodium silicate which is difficult to separate from the iron oxide upon leaching. The alkaline material mixed with the iron-bearing material may be any compound which will result after the reaction in a soluble substance and an alkali metal compound such as sodium or potassium carbonate, bicarbonate, or hydroxide is generally selected. The corbonates due to their cheapness and availability are particularly applicable.

As previously pointed out, the ratio of the iron-bearing substance to the alkali material determines in a large measure the percentage of voids in the iron oxide obtained. However, in order to insure complete reaction, it is desirable to have at least equivalent amounts of iron and alkali and preferably an excess of the alkali is employed. The alkaline material may be in solid form or as is more usually the case dissolved in water since a cyclic process is available in which the alkaline material leached from the ferric oxide is returned to storage and is thereafter mixed in solution with the iron-bearing material.

In a typical case pyrites cinder is mixed with a solution containing sodium carbonate and sodium hydroxide resulting from previous processes as will hereinafter appear, the alkali figured as $Na_2O$ being added in a percentage of 10% in excess of the theoretical amount required to form sodium ferrite $Na_2Fe_2O_4$. The iron in the pyrites is figured as $Fe_2O_3$. The mixture is then thoroughly agitated in a mixer and is ground therein if the pyrites particles are not sufficiently small in size to react effectively with the alkali. For example, the grinding may reduce the material to a size so that all of it will pass through a 40-mesh screen (Bureau of Standards). The mixture is then passed through a suitable drier, for example, one in which dry heated air is passed therethrough countercurrently to the material. In this drying operation, the material agglomerates to some extent which is not disadvantageous. After the mixture has been dried, it is passed through a kiln maintained at a sufficient temperature to sinter the material and bring about the formation of sodium ferrite. Agglomeration of the particles also takes place during the treatment of the material in the kiln. A rotary kiln heated to a temperature in the neighborhood of 1650° F. to 1800° F. may be employed. The sintered mass is then placed in a leaching tank and the sodium ferrite decomposed by the addition of water to form sodium hydroxide and ferric oxide. The ferric oxide granules are washed without destroying their granular nature until a negative test for alkali is obtained. The leaching and washing processes are preferably carried out without appreciably destroying or changing the size or shape of the original ferrite granule and in all cases these processes do not destroy the granular nature of the ferric oxide particles. The granular material may be used immediately, or if it is to be shipped it may be dried in any suitable manner. The solution either as obtained or after concentration may be utilized in the process in treating additional amounts of iron-bearing material.

Preferably the sintered granules obtained from the kiln are leached with hot water which may be advantageously carried out in a closed container to which steam under pressure is admitted. The pressure of the steam may vary from two to three pounds per square inch up to one hundred pounds per square inch or higher; the greater the pressure of the steam and consequently the higher the temperature thereof, the faster will be the leaching process.

In a typical apparatus which has been found particularly applicable, the granules to be leached are placed in the bottom of a closed container and water is admitted thereto, the water level being higher than the level of the material to be leached. The steam is admitted into a centrally disposed pipe whose outlet is above the level of the solid material but below the level of the water. The centrally disposed pipe is provided with a deflecting plate which directs the hot water in a downward direction. This deflecting plate also prevents the granular material from filling the centrally disposed pipe. The solution outlet is at the bottom of the container. The granules are leached and washed free from alkali in this container and may be advantageously dried therein by passing steam through the granules after the removal of the water followed by the passage of dry heated air.

The size of the granules obtained from the leaching tank will vary widely, but in general at least 65% will be retained on a 40-mesh screen (Bureau of Standards). In a typical instance 13.72% of the material is retained on a 4-mesh screen; 18.32% passes through a 4-mesh screen and is caught on an 8-mesh screen; 26.80% passes through an 8-mesh screen and is caught on a 20-mesh screen; 6.80% passes through a 20-mesh screen and is caught on a 40-mesh screen; and the remainder passes through a 40-mesh screen. All of the screens mentioned above correspond to the requirements of the Bureau of Standards. The material that is obtained may be employed directly or it may be sized or ground if desired. In any event the smallest granules will be of sufficient size to be visible to the naked eye and to roll one upon the other. Each individual granule will be characterized by its high porosity and also by its great activity and effectiveness as previously described.

Considerable modification is possible in the steps of the method utilized in producing the product of the invention, as well as in the size of the final granular product without departing from the essential features of the present invention.

I claim:

1. Gas purification material comprising porous granules of artificially prepared cryptocrystalline ferric oxide of high activity, the individual granules being visible to the naked eye and containing at least 40% voids.

2. Gas purification material comprising porous granules of artificially prepared cryptocrystalline ferric oxide of high activity, the individual granules being visible to the naked eye and containing in the neighborhood of 50% voids.

3. The process of preparing porous granular gas purification material, the individual particles of which are visible to the naked eye, comprising mixing together in finely divided form an iron-bearing material and an alkali material capable of reacting therewith to form an alkali ferrite, the alkali material being present molecularly in excess of the iron in the iron-bearing material figured as $Fe_2O_3$, sintering said mixture to form an alkali ferrite in granular form, and thereafter leaching said alkali ferrite with water to form ferric oxide granules without destroying the granular nature of said ferric oxide.

4. The process of preparing porous granular gas purification material, the individual particles of which are visible to the naked eye, comprising mixing together in finely divided form an iron-bearing material and an alkali material capable of reacting therewith to form an alkali ferrite, the alkali material being present molecularly in excess of the iron in the iron-bearing material figured as $Fe_2O_3$, sintering said mixture to form an alkali ferrite in granular form, and thereafter leaching said alkali ferrite with water to form ferric oxide granules without appreciably destroying or changing the size or shape of the original ferrite granules.

5. The process of preparing porous granular gas purification material, the individual particles of which are visible to the naked eye, comprising mixing together in finely divided form an iron-bearing material and an alkali metal compound capable of reacting therewith to form an alkali metal ferrite, the alkali metal compound being present molecularly in excess of the iron in the iron-bearing material figured as $Fe_2O_3$, sintering said mixture to form an alkali metal ferrite in granular form, and thereafter leaching said alkali metal ferrite with water to form ferric oxide granules without destroying the granular nature of said ferric oxide.

6. The process of preparing porous granular gas purification material, the individual particles of which are visible to the naked eye, comprising mixing together in finely divided form an iron-bearing material and an alkali metal compound capable of reacting therewith to form an alkali metal ferrite, the alkali metal compound being present molecularly in excess of the iron in the iron-bearing material figured as $Fe_2O_3$, sintering said mixture to form an alkali metal ferrite in granular form, and thereafter leaching said alkali metal ferrite with water to form ferric oxide granules without appreciably destroying or changing the size or shape of the original ferrite granules.

7. The process of preparing porous granular gas purification material, the individual particles of which are visible to the naked eye, comprising mixing together in finely divided form an iron-bearing material and a sodium compound capable of reacting therewith to form sodium ferrite, the sodium compound being present molecularly in excess of the iron in the iron-bearing material figured as $Fe_2O_3$, sintering said mixture to form sodium ferrite in granular form, and thereafter leaching said sodium ferrite with water to form ferric oxide granules without destroying the granular nature of said ferric oxide.

8. The process of preparing porous granular gas purification material, the individual particles of which are visible to the naked eye, comprising mixing together in finely divided form an iron-bearing material and a sodium compound capable of reacting therewith to form sodium ferrite, the sodium compound being present molecularly in excess of the iron in the iron-bearing material figured as $Fe_2O_3$, sintering said mixture to form sodium ferrite in granular form, and thereafter leaching said sodium ferrite with water to form ferric oxide granules without appreciably destroying or changing the size or shape of the original ferrite granules.

9. The process of preparing porous granular gas purification material, the individual particles of which are visible to the naked eye, comprising mixing together in finely divided form an iron-bearing material and an alkali metal compound capable of reacting therewith to form an alkali metal ferrite, the alkali metal compound being present molecularly in excess of the iron in the iron-bearing material figured as $Fe_2O_3$, sintering said mixture to form an alkali metal ferrite in granular form, placing said alkali metal ferrite in a container, leaching said alkali metal ferrite with water heated by admission thereto of steam under pressure to form ferric oxide granules without destroying the granular nature of the ferric oxide.

10. The process of preparing porous granular gas purification material, the individual particles of which are visible to the naked eye, comprising mixing together in finely divided form an iron-bearing material and a sodium compound capable of reacting therewith to form sodium ferrite, the sodium compound being present molecularly in excess of the iron in the iron-bearing material figured as $Fe_2O_3$, sintering said mixture to form sodium ferrite in granular form, placing said sodium ferrite in a container, leaching said sodium ferrite with water heated by admission thereto of steam under pressure to form ferric oxide granules without destroying the granular nature of the ferric oxide.

GILBERT E. SEIL.